United States Patent
Buller-Colthurst

(10) Patent No.: US 9,060,523 B1
(45) Date of Patent: Jun. 23, 2015

(54) THERMAL PROCESS FOR FOOD ENHANCEMENT

(71) Applicant: Guy E Buller-Colthurst, Grand Haven, MI (US)

(72) Inventor: Guy E Buller-Colthurst, Grand Haven, MI (US)

( * ) Notice: Subject to any disclaimer, the term of this patent is extended or adjusted under 35 U.S.C. 154(b) by 107 days.

(21) Appl. No.: 14/042,021

(22) Filed: Sep. 30, 2013

Related U.S. Application Data

(60) Provisional application No. 61/744,588, filed on Oct. 1, 2012.

(51) Int. Cl.
| | |
|---|---|
| *A23L 3/42* | (2006.01) |
| *A23B 4/033* | (2006.01) |
| *A23B 4/03* | (2006.01) |
| *A23L 1/31* | (2006.01) |
| *A23L 1/315* | (2006.01) |
| *A23L 1/01* | (2006.01) |
| *A23L 3/40* | (2006.01) |
| *A47J 27/04* | (2006.01) |

(52) U.S. Cl.
CPC . *A23B 4/033* (2013.01); *A23B 4/03* (2013.01); *A23L 1/31* (2013.01); *A23L 1/315* (2013.01); *A23L 1/0121* (2013.01); *A23L 3/42* (2013.01); *A23L 3/40* (2013.01); *A47J 2027/043* (2013.01)

(58) Field of Classification Search
CPC .......... A23B 4/005; A23B 4/03–4/033; A23L 1/0121; A23L 1/0135; A23L 1/21; A23L 1/315; A23L 3/40; A23L 3/423; A47J 27/04; A47J 2027/043
USPC .......... 426/641, 644–646, 465, 510–511, 520
See application file for complete search history.

(56) References Cited

U.S. PATENT DOCUMENTS

| | | | | |
|---|---|---|---|---|
| 4,011,805 | A * | 3/1977 | Vegh et al. | 99/467 |
| 4,384,009 | A * | 5/1983 | Lewis et al. | 426/646 |
| 4,495,932 | A | 1/1985 | Bratton | |
| 4,933,200 | A * | 6/1990 | Shimizu | 426/510 |
| 5,075,121 | A * | 12/1991 | Desage et al. | 426/233 |
| 5,158,064 | A * | 10/1992 | Willis et al. | 126/20 |
| 5,505,975 | A | 4/1996 | Taylor | |
| 5,731,029 | A * | 3/1998 | Karwowski et al. | 426/646 |
| 8,044,326 | B2 | 10/2011 | Ando et al. | |
| 2009/0148574 | A1* | 6/2009 | Levin | 426/335 |
| 2010/0126358 | A1* | 5/2010 | Ueda et al. | 99/422 |
| 2011/0177221 | A1* | 7/2011 | Kano et al. | 426/511 |
| 2012/0040062 | A1* | 2/2012 | Srsen et al. | 426/243 |
| 2013/0089648 | A1* | 4/2013 | Meyer et al. | 426/455 |
| 2014/0199455 | A1* | 7/2014 | Bilet et al. | 426/510 |
| 2014/0220206 | A1* | 8/2014 | Nakayama et al. | 426/444 |

* cited by examiner

*Primary Examiner* — Drew Becker

(57) ABSTRACT

A thermal process used to modify the moisture content and appearance of food, primarily meat, poultry and fowl, so that the resulting product will meet the USDA label requirement as "Jerky". The process takes place in one or more enclosed insulated chambers which have temperature and relative humidity controls and reversing horizontal air flow. The process preconditions the product and also controls the application of superheated steam to the product, thereby controlling the reduction of free and bound moisture (water activity) exiting from the product. In addition, enhanced heated vapors can be added to be absorbed into the product's surface pours, thereby changing the appearance and flavor of the product and improving the end products' yields. The completed process also has the advantages of meeting lethality treatment requirements while also reducing the thermal processing time and energy associated with existing Jerky manufacturing methods.

37 Claims, 1 Drawing Sheet

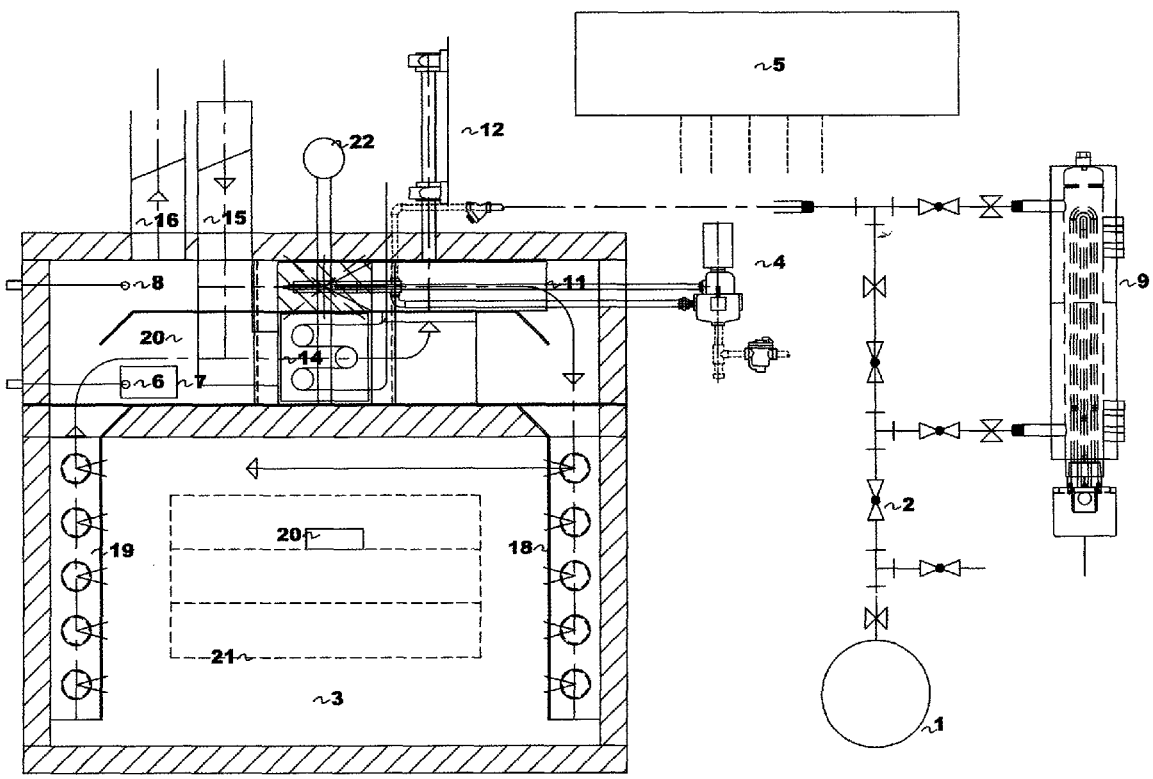

THERMAL PROCESS FOR FOOD ENHANCEMENT

CROSS-REFERENCE TO RELATED APPLICATION

This Application claims the benefit, for all purposes, of U.S. Provisional Application No. 61/744,588 filed on Oct. 1, 2012, the entire disclosure of which is incorporated herein by this reference.

FIELD OF THE INVENTION

This invention relates to a method of processing food products. In particular, it relates to methods of manufacturing jerky style and other shelf stable products, in an industrial or commercial application. The process could also be used on other, non-shelf stable, food products.

BACKGROUND OF THE INVENTION

Jerky is a food product that is manufactured under the guidelines of the USDA's public health agency, the Food Safety and Inspection Service (FSIS). It is manufactured for both human and animal consumption. The generally-accepted definition of jerky is a shelf stable (not requiring refrigeration), nutrient-dense, whole-muscle product. It can be marinated or not and sliced or ground. For manufacturing, it is normally formed from meat cut into strips or other shapes, and typically laid on screens and then heated to an internal temperature of greater than 160 degrees Fahrenheit for beef or greater than 165 degrees Fahrenheit for poultry. This heating generally occurs within an air stream having greater than 90% relative humidity.

Once the necessary internal temperature is achieved and the product is subject to the high relative humidity, the product is then dried in a conditioned airstream until a water activity of less than 0.70 is realized and greater than 7 log reduction of microbes is achieved. The most important microbes to be removed are *Salmonella, E. coli* O157:H7, and *Listeria*. If these steps (results) are not accomplished, then the product cannot legally be labeled jerky.

At present, the accepted way to manufacture jerky is to process it in thermal processing ovens called Smokehouses. The jerky is laid out on screens which normally are stacked on 4 inch vertical centers and attached to racking that is inserted into an oven. The oven has set point controls for both Dry Bulb and Wet Bulb temperatures, which are programmed to run for certain elapsed times in order to achieve the first step of heating and humidity application, which in turn achieves the greater than 7 log reduction of microbes. This step is the lethality step.

The next step is the drying phase where the Dry Bulb and Wet Bulb temperatures are again set with time restraints, this time to achieve a removal of free moisture (the water content) as well as the bound moisture which is a measure of the water activity. The correct water activity then being met verifies the process is complete and the product is now 'Jerky'.

During the process, the airflow in the oven is achieved using convection that is produced by recirculating fans that discharge the air through nozzles or slots down into the oven after being conditioned with the controlled heat and humidity set points.

Drying the product using this method is by evaporation, using airflow across (around) the product to remove moisture that is exiting the body of the product. If the airstream cannot surround the product uniformly, the drying will be detrimentally affected, which leads to under or over drying and yield issues as well as food safety issues (Lethality).

This process can also cause case hardening of some surfaces, thereby trapping moisture. This often does occur in the majority of ovens because the air stream runs down the sides of the oven then returns upward, through the product, back to the fan. Since the jerky is laid flat, it impedes the airflow and non-uniform product is the result. To try to overcome this deficit, the process time has to be increased because the top screen of product is not as dry as the bottom screen of product and consequently the internal temperature varies, as does the yield.

Other issues occur during the initial heating step with the high relative humidity set point (the lethality step). The product, being colder than the airstream, has a lower dew point than the atmosphere and, therefore, condensation occurs on the product's surface creating more moisture to be removed, as well as discoloration (blanching). In order to dry the product, fresh air is injected into the oven and is then exhausted, which carries out excess humidity (moisture). This process also is in the presence of oxygen (which is a requirement of bacteria and mold growth) adding to the safety issues.

These issues increase the drying process and extend the total processing time by approximately 25%. The average process takes approximately 6 to 10 hours or more to complete. This depends on the thickness of the product and the efficiency of the ovens used.

A few prior art references are noted. U.S. Pat. No. 4,495,932 is directed to "freshen" precooked foods using steam for heating, then the steam is dried and superheated and flows around the food compartment imparting a limited amount of moisture to freshen it. This patent uses superheated steam to heat the product and add moisture. In reality, the dry superheated steam removes moisture from the product, which is the case in our invention.

U.S. Pat. No. 8,044,326 is directed to home use steam cookers involving a vapor heating heater. This patent uses superheated steam to heat a chamber which then is used as a radiant heater. We do not use this technology. In the present invention, the pre-heating of the chamber is done by a separate heat source with convection and then super-heated steam is added. This is done to eliminate any condensation occurring within the chamber.

U.S. Pat. No. 5,505,975 is directed to cooking under pressure with compressed air and superheated steam. This also differs from the present invention, which does not use pressure in the chamber. In the present invention, steam is pressurized into the chamber but the chamber is open by exhaust and therefore not pressurized. Compressed air is not used. The use of compressed air would condense the steam since compressed air temperature is below that of the saturation temperature of the steam.

BRIEF SUMMARY OF THE INVENTION

Knowing of the limitations and processing problems as detailed in the background of the invention, and within the existing art of jerky manufacturing, I have developed a solution to overcome those deficiencies and to create a safe and unique process.

The present invention utilizes the ability of superheated steam to release moisture at a controlled rate out of jerky products. This is done by vaporizing the water content, in effect boiling the moisture, which achieves the release and also meets the lethality requirements. By doing so, the process can destroy any pathogens, alter the appearance and flavor of the jerky, as well as control the yield during the process.

The invention takes into account the uniformity issues associated with jerky manufacturing and creates an environment and a process which thoroughly processes that product in a uniform way and condition which results in a better yield, a better appearance (color), a better flavor, a reduced processing time, better shelf life, less energy consumption, less space within manufacturing facilities and a safer product.

BRIEF DESCRIPTION OF THE DRAWING

FIG. 1 shows a schematic diagram of one of the embodiments of the invention.

DETAILED DESCRIPTION OF INVENTION

Much of my research has focused on drying technology and the effects of heating wet steam above its saturation temperature in order to extract moisture out of jerky style products. When water is heated to its boiling point it is considered saturated steam and it cannot accept any more moisture at that point. When that steam is then heated above its saturation temperature it becomes unsaturated. The more saturated steam is heated, the more its relative humidity declines (drying), which means it can accommodate more moisture.

To demonstrate this using a prototype, I conducted tests to manufacture jerky products using that technology and through those tests have developed the process I wish to patent, explained as follows:

The product produced is edible food and is consumed by both humans and animals and is manufactured under the regulations written by the FSIS, a division of the USDA. Generally the Jerky product is prepared as whole muscle or ground. It is normally frozen and placed on screens in a variety of shapes which are racked and set inside an insulated chamber.

The process utilizes a recirculated airflow. The air is heated by gas, indirect steam, or electricity and is humidified by wet steam or atomized water. This is preferably controlled by a Wet Bulb and a Dry Bulb Psychrometer arrangement or a combination Hygrometer (Dry Bulb and Relative Humidity or Dew Point). The Dry Bulb set point is the ambient temperature of the chamber's heated air and the Wet Bulb set point is the temperature of that air cooled to saturation. The corresponding Dry Bulb temperature and the Wet Bulb temperature equates to the Relative Humidity of the air stream. These temperatures are set and controlled by a PLC or its equivalent during the processing steps.

The chamber is equipped with an insulated circulation fan which distributes the conditioned air stream into the chamber's processing area. The airstream enters insulated ductwork on the discharge side of the main fan, allowing the fan's airflow to transport it into the chamber. The chamber is also insulated from the fan and ductwork eliminating any radiant heating. The airstream then is directed horizontally from side to side inside of the chamber by a set of rotating dampers programmed to modulate at a certain elapsed time, thereby moving the air back and forth.

The air is discharged out horizontally through perforated ductwork and is recaptured on the opposite side of the chambers by perforated ductwork and returned to the main recirculation fan for reuse. This continues during the process and allows for a uniform airflow and, therefore, uniform product throughout the horizontal direction of travel.

As the airstream is returned to the main fan it is directed through an internal heater, which is controlled by the Dry Bulb and normally a gas fired arrangement or electric coil. This heating on the suction side of the fan reheats the airstream back to set point, making up any temperature loss. Both the recirculation fan and the internal airstream heater control the ambient heat within the chamber.

The temperature of the airstream is sensed by an RTD or Thermal Couple and fed into the PLC or equal, giving the actual Dry Bulb temperature, which is then compared to the set point. A signal is then sent to the heating element to adjust and control the actual temperature.

There is another RTD or Thermal Couple (or Hygrometer) which houses the Wet Bulb. This captures that temperature and feeds it into the PLC or equal giving the actual Wet Bulb temperature, which is then compared to the set point. A signal is then sent to a humidifier which adds humidity into the oven at the discharge side of the fan, or, in the event of drying, dehumidifies by opening and closing the necessary dampers which supply fresh air and exhaust air to and from the chamber. This can also be accomplished by an in situ dehumidifier.

During this step another control can be used. The surface temperature of the product being produced is captured by infrared technology and is inputted into the PLC, which compares that temperature with the actual Dew Point temperature within the chamber. This is a controlling function of the environment within the oven wherein the control analyses this data and can adjust the set points of the Dry and Wet Bulb to increase or decrease the Dew Point temperature within the chamber to eliminate condensation on the product. The controller has this option using psychometric equations to evaluate the conditions and respond.

This convection step of the process using Dry and Wet Bulb control or Hygrometer control is necessary to defrost the product, to initially cook the product, thereby relaxing the product, and conditioning it to accept the next step in the process which is the high temperature (heated above saturation) steam application.

The heated steam step process requires wet steam produced by a boiler under a set pressure and therefore temperature in order to transport the steam in pipes to the chamber. The boiler or steam generator should be fed by DI (deionized) or RO (reverse osmosis) water for clarity, but can also be fed by existing utility supplied water, preferably softened and demineralized. The boiler should preferably be made from stainless steel wetted parts but could be from standard mild steel wetted parts.

The boiler feeds the steam to a circulation heater via piping equipped with necessary strainers and pressure reducing valves. That steam then will enter a circulation heater which increases the supplied steam's temperature to superheated conditions. This increase in heat is monitored and controlled by a PLC or equal which is programmed to a certain temperature set point of the discharging superheated steam.

This dry steam is then directed into the insulated chamber. The chamber (in most cases the same chamber used in the first step) is equipped with a circulation fan which distributes the superheated steam into the chamber's processing area. The superheated steam enters the insulated ductwork on the discharge side of the main fan, allowing the fan's airflow to transport it into the chamber. All components are insulated, avoiding any condensation within the system. The superheated steam then is directed horizontally from side to side inside of the chamber by a set of rotating dampers programmed to modulate at a certain elapsed time, moving the superheated steam back and forth. The superheated steam accepts the released moisture. The superheated steam is discharged out horizontally and is recaptured on the opposite side of the chamber with perforated ductwork and returned to the main recirculation fan for reuse. This continues during the process and allows for a uniform steam flow throughout the direction travelled.

As the superheated steam is returned to the main fan it is directed through an internal duct heater, normally of the gas-fired or electric coil variety. This heating on the suction side of the fan reheats the superheated steam back to the set point, but, more importantly, continually heats the internal wetted surfaces of the chamber. This is necessary to eliminate any condensation on the surfaces and also to control the surfaces temperature to correspond the superheated steam temperature so as to not cause radiant heating within the chamber. Radiant heating has been found to off color and over process the product.

It is important to have that internal heater since any condensation within the chamber eliminates the heating efficiency since the superheated steam's heat must now be directed to vaporize the condensate and not directed to achieving what is intended, that being the envelopment of the product and vaporizing its moisture.

The process of heating the wetted surfaces of the chamber takes place initially after start up prior to the injection of the superheated steam again eliminating any initial condensation.

Within the chamber is a rack equipped with screens which holds the jerky product in place in order to be processed. The superheated steam is injected into the discharge side of the main recirculation fan which then distributes it down into the chamber and turns it horizontally and directs it over the product. At first, this superheated steam envelopes the product and vaporizes any condensate on the product's surface, if present.

The system vaporizes not evaporates. Keeping the temperature of the superheated steam under control also eliminates case hardening of the products surface throughout the process as experienced with evaporation techniques.

The superheated steam then begins to boil the moisture (water) within the body of the product. As the water boils, it vaporizes and is captured by the superheated steam when exiting the products surface into the superheated steam's volume, removing it from the product. This then reduces the free moisture % (weight) within the product. This continues for a set period of time, and then, at approximately 35% free moisture (extrapolated by weight yield), the bound moisture within the product starts to release. I have observed that the water content (free moisture) drops very quickly in the superheated steam environment until it reaches ~35%, at which time the water activity then starts to drop quickly and the free moisture continues to drop but slowly.

By controlling these moisture releases the yield can be better controlled. The bound moisture is measured by the water activity of the product. Once that water activity is less than 0.70 the moisture removal process is completed.

During the superheated steam application, the temperature of the product increases to its saturation temperature, which is the actual temperature of the initial wet steam's temperature. This temperature is the Wet Bulb temperature of the environment within the chamber. When this occurs, the product is now maintaining 100% relative humidity and its internal temperature is above 212 degrees F. (depending on the wet steam's initial pressure). This then destroys all viruses and bacteria, if present at that time, and, therefore, completes the Lethality requirements of the FSIS.

The temperature of the chambers wetted parts and the actual temperature of the superheated steam is monitored and controlled by a PLC or its equivalent. During the process of superheating, the temperature of the chamber and the superheated steam is adjusted according to the desired yield and appearance of the end product. By controlling these temperatures, we can also control the products appearance caused by the Maillard Reaction.

The Maillard Reaction is defined as a form of nonenzymatic browning. It is a result of the chemical reaction between the amino acids and the reducing sugars, which requires heat. This is a natural occurrence. When the product releases the majority of its free moisture, the surface temperature increases. With this increase in temperature the Maillard Reaction commences. This affect causes the product's surface to deepen in color. Similar occurrences develop in toasting bread as an example. By controlling that surface temperature, I can control the Maillard Reaction, and, therefore, control the appearance.

The other reaction is the product's conditioning through the escape of moisture by vaporization. When the moisture releases out of the product as a vapor, it opens the surface pores of the product. When the pores are opened, and at a designated time, injecting outside vapors into the chamber will cause the product to absorb these additions, which leads to appearance changes and flavoring. It also can contribute to the product's yield. The additions are of a non-water content which do not support bacteria and viruses but do add to the product's weight. The vapors are generated by heating liquids to vapor to a temperature over the saturation temperature of the superheated steam (the wet steam's saturation temperature). By doing this the superheated steam will not condense out.

If any substance air or liquid is injected into the superheated steam's environment and below the saturation temperature of the superheated steam, it would cause the superheated steam to condense, so this is avoided. Injecting liquid has shown to exhibit this, since the liquid most likely will be colder than the steam.

By changing the appearance of a product in this fashion it is not necessary to subject the product to impingement, brazing or radiant heating to show color. During that type of process (i.e., impingement, brazing or radiant heating) the product loses weight and uniformity. By using the process of the present invention, yield is added and uniformity is maintained.

Since superheated steam has no oxygen, it adds to the shelf life of the product because it does not contribute to rancidity, which contributes to mold and fungus growth.

The chamber can be designed as a batch operation with a multiple step process or a continuous or batch operation with individual chambers for each step of the process.

One embodiment of the invention is shown in the included drawing. As shown in FIG. 1, a boiler 1 is used to supply wet steam under pressure to supply piping 2. This steam is utilized in two separate functions in the invention. It is first used to humidify the heated air within the chamber 3 through a steam control valve 4 operated by a PLC 5 which controls the Wet Bulb temperature from a pre-programmed set point. The control of the set point is accomplished by an RTD 6 or thermal couple located within the air steam of the chamber. This thermal couple in most operations is a wet sock located within a Psychrometer pan 7 (a hygrometer can also be used) and is used to compare with the Dry Bulb RTD 8 or thermal couple to give the relative humidity of the air stream which is programmed in the PLC 5.

The other use of this steam is to feed a circulation heater 9 which heats the steam supplied above its saturation point to a set temperature controlled by a PLC 5 temperature controller. The steam in both cases enters the chamber within the discharge ductwork 11 of a recirculation fan 12 and is carried by the velocity pressure of the fan into the chamber's inner area 3. The selection of the two different steam feeds is done by the PLC 5 program based on a recipe inputted into the controls.

The other temperature control in the invention is the Dry Bulb control which controls the chamber's ambient temperature. There is an RTD 8 or thermal couple within the chamber's air stream which signals the actual temperature and compares it with the set point temperature within the PLC 5. The temperature then changes to suit the set point.

The heating of the ambient air is by a gas burner or an electric coil 14 or other device. This will modulate the temperature and control.

In order to control the dehumidifying level within the chamber 3 there is a drying system made up of Fresh Air intake operated by a damper 15 working off the Wet Bulb 6 signal within the PLC 5 and an Exhaust damper 16 working off the Wet Bulb 6 signal within the PLC control.

The main recirculation fan 12 discharges air into a supply ductwork 11 which directs the air or steam down into the chamber where it is distributed into duck work which is perforated 18 to direct the air horizontally across the chamber's width. This air or steam, depending on the steps in the process, is captured across the chamber on the other side by a similar set of ductwork 19. The air or steam then is returned by suction through another set of ducts 20 through the heating coil or similar 14 then back into the recirculation fan 12.

The air and steam stream within the chamber 3 runs horizontally across the area and meets the jerky product 20 attached to screens and racks 21. The time duration for the different steps detailed in the description of the invention are programmed into the PLC 5 and the process as explained in this description of the invention is run. The supply and the return air or steam flow is directed mechanically from one side to the other of the chamber by a controlled rotary damper 22.

I claim:

1. A method for processing a product into jerky in an oven, the method comprising the steps of:
    one or more preconditioning phases wherein the product is preconditioned through heating it to a predetermined internal temperature in a first set of one or more oven environments, the first set of oven environments having a first set of temperature ranges, the first set of temperature ranges having a first set of maximum temperatures that are each substantially less than the boiling point of water in the oven, the first set of oven environments also having a first set of relative humidity ranges, the first set of relative humidity ranges having a first set of minimum relative humidities; and
    one or more drying phases, occurring after the one or more preconditioning phases wherein the product is dried by superheated steam to a predetermined internal water activity level in a second set of one or more oven environments, the second set of oven environments having a second set of temperature ranges, the second set of temperature ranges having a second set of minimum temperatures that are each greater than the boiling point of water in the oven, the second set of oven environments also having a second set of relative humidity ranges, the second set of relative humidity ranges having a second set of maximum relative humidities that are each less than any of the first set of minimum relative humidities.

2. The method of claim 1 wherein substantially all of the drying of the product during the one or more drying phases occurs through vaporization rather than evaporation.

3. The method of claim 1 wherein a reduction in the water activity of the product occurs during the process, whereby the internal water activity of the product is reduced to at or below 0.7.

4. The method of claim 3 wherein the reduction in water activity of the product occurs substantially entirely during the drying phase.

5. The method of claim 1 wherein convection currents are utilized to maintain the conditions of the first set of oven environments within each of the first set of temperature ranges and each of the first set of relative humidity ranges.

6. The method of claim 1 wherein convection currents are utilized to maintain the conditions of the second set of oven environments within each of the second set of temperature ranges and each of the second set of relative humidity ranges.

7. The method of claim 6 wherein the oven comprises a first set of one or more air duct vents located on a first side wall of the oven and a second set of one or more air duct vents located on a second side wall of the oven, the second side wall being located opposite an oven interior from the first side wall.

8. The method of claim 7 further comprising the step of:
    maintaining the convection currents in the oven by forcing air into the oven through the first set of air duct vents and out of the oven through the second set of air duct vents.

9. The method of claim 8 further comprising the step of:
    maintaining the convection currents in the oven by forcing air into the oven through the second set of air duct vents and out of the oven through the first set of air duct vents.

10. The method of claim 1 wherein water inside the product is boiled out of pores in the product during the one or more drying phases.

11. The method of claim 1 further comprising the step of:
    controlling the maillard reaction in the product by adjusting a flow and temperature of superheated steam during the one or more drying phases.

12. The method of claim 1 wherein the lethality requirements set by the FSIS are met during the one or more drying phases.

13. The method of claim 1 further comprising the step of:
    adding a vaporized substance during the one or more drying phases, whereby the substance is drawn into the product through vacated pores in the surface of the product.

14. The method of claim 13 wherein the vaporized substance comprises one or more of a flavor additive, a color additive, and an antitoxin.

15. The method of claim 1 wherein the one or more preconditioning phases and the one or more drying phase occur in different sections of the oven.

16. The method of claim 1 wherein the one or more preconditioning phase and the one or more drying phases occur in the same section of the oven.

17. The method of claim 1 wherein an internal chamber of the oven is insulated from a heating mechanism, whereby the product is not subject to radiating heat caused by the heating mechanism.

18. The method of claim 1 wherein the product is poultry.

19. The method of claim 1 wherein the predetermined internal temperature is at least 165 degrees Fahrenheit.

20. The method of claim 1 wherein during the use of the method, the area encompassing the product maintains a relative humidity that is less than 90% relative humidity.

21. A method of processing a food product comprising the steps of:
    placing the food product in an internal cooking chamber of an oven;

preconditioning the food product by increasing an internal temperature of the food product to a predetermined temperature, the preconditioning including the steps of:
   creating a first portion of wet steam using a boiler, the first portion of wet steam being saturated steam;
   delivering the first portion of wet steam to a supply duct located within the oven via a first set of steam piping connecting the boiler to the supply duct thereby creating a first conditioned air stream in the oven;
   circulating, using a fan, the first conditioned air stream in a first direction in the supply duct into the internal cooking chamber through a first set of one or more vents located on a first wall of the internal cooking chamber, through an interior area of the internal cooking chamber, out of the internal cooking chamber through a second set of one or more vents located on a second wall of the internal cooking chamber, and then back to the fan through the supply duct;
   circulating, using the fan, the first conditioned air stream in a second direction in the supply duct into the internal cooking chamber through the second set of one or more vents, through the interior area of the internal cooking chamber, then out of the internal cooking chamber through the first set of one or more vents, and then back to fan through the supply duct;
   monitoring the temperature of the internal cooking chamber using a Dry Bulb thermometer;
   adjusting the temperature of the internal cooking chamber by using a first heating mechanism, located outside of and insulated from the internal cooking chamber, to adjust the temperature of the first conditioned air stream;
   monitoring the humidity of the internal cooking chamber using a psychrometer or a hygrometer; and
   adjusting the relative humidity of the internal cooking chamber by adjusting the relative humidity of the first conditioned air stream;
drying the food product by decreasing an internal water activity of the food product to a predetermined internal water activity level, the drying including the steps of:
   creating a second portion of wet steam using the boiler, the second portion of wet steam being saturated steam;
   delivering the second portion of wet steam to a secondary heater via a second set of supply piping connecting the boiler to the secondary heater;
   creating a first portion of dry steam by heating the second portion of wet steam in the secondary heater, the first portion of dry steam being superheated steam;
   delivering the first portion of dry steam to the supply duct located within the oven via a third set of steam piping connecting the secondary heater to the supply duct thereby creating a second conditioned air stream in the oven;
   circulating, using a fan, the second conditioned air stream in the first direction in the supply duct into the internal cooking chamber through the first set of one or more vents, through the interior area of the internal cooking chamber, out of the internal cooking chamber through the second set of one or more vents, and then back to the fan through the supply duct;
   circulating, using the fan, the second conditioned air stream in a second direction in the supply duct into the internal cooking chamber through the second set of one or more vents, through the interior area of the internal cooking chamber, then out of the internal cooking chamber through the first set of one or more vents, and then back to fan through the supply duct;
   monitoring the temperature of the internal cooking chamber using a thermometer;
   monitoring the humidity of the internal cooking chamber using a psychrometer or a hydrometer; and
   adjusting the relative humidity and the temperature of the internal cooking chamber by adjusting the relative humidity and the temperature of the second conditioned air stream.

22. The method of claim 21 further comprising the steps of:
   determining an actual dew point of the internal cooking chamber;
   monitoring, using infrared technology, a surface temperature of the food product; and
   adjusting one or both of the temperature of the internal chamber and the humidity of the internal chamber such that the surface temperature of the food product is maintained above the actual dew point.

23. The method of claim 21 wherein the method is used to make jerky.

24. The method of claim 21 wherein substantially all of the bound moisture that is removed from the food product during use of the method is through vaporization.

25. The method of claim 21 wherein convection currents are used to maintain the food product yields by adjusting the humidity within the internal cooking chamber.

26. The method of claim 21 wherein the drying of the food product further comprises the step of:
   boiling a substantial amount of internal moisture out of the food product.

27. The method of claim 21 wherein the drying of the food product further comprises the step of:
   controlling the maillard reaction in the food product by adjusting one or both of the temperature and humidity of the second conditioned air stream.

28. The method of claim 21 wherein the drying of the food product further comprises the step of:
   adding one or more of a vaporized flavor additive, a vaporized color additive, and a vaporized antitoxin additive to the internal cooking chamber, whereby the additive is drawn into the product through pores in the surface of the product.

29. The method of claim 21 wherein the oven is a batch oven.

30. The method of claim 21 wherein the oven is a continuous oven.

31. The method of claim 21 wherein the first heating mechanism comprises a temperature-adjustable heat exchanger through which the first conditioned air stream passes.

32. The method of claim 31 wherein the heat exchanger is gas-powered.

33. The method of claim 31 wherein the heat exchanger further comprises electric coils.

34. The method of claim 21 wherein the step of adjusting of the relative humidity of the first conditioned air stream comprises the steps of:
   creating additional saturated, wet steam using the boiler; and
   delivering the additional saturated, wet steam to the supply duct located within the oven via the first set of steam piping connecting the boiler to the supply duct.

35. The method of claim 21 wherein the step of adjusting of the relative humidity of the first conditioned air stream comprises the steps of:

opening a fresh air damper in the supply duct, thereby allowing dry air to enter the oven; and undertaking one or both of the steps of (i) exhausting some wet air out of the first conditioned air stream via the fresh air damper or (ii) using a mechanical dehumidifier to condense some moisture out the first conditioned air stream.

36. The method of claim 21 wherein the step of adjusting the relative humidity and the temperature of the second conditioned air stream comprises the step of:

creating additional saturated, wet steam using the boiler;

increasing the temperature of the secondary heater;

delivering the additional saturated, wet steam to the secondary heater via the second set of supply piping connecting the boiler to the secondary heater;

creating additional superheated, dry steam by heating the additional, saturated wet steam in the secondary heater; and delivering the additional superheated, dry steam to the supply duct located within the oven via the third set of steam piping connecting the secondary heater to the supply duct.

37. The method of claim 21 wherein the step of adjusting the relative humidity and the temperature of the second conditioned air stream comprises the step of:

creating additional saturated, wet steam using the boiler;

decreasing the temperature of the secondary heater;

delivering the additional saturated, wet steam to the secondary heater via the second set of supply piping connecting the boiler to the secondary heater;

creating additional superheated, dry steam by heating the additional, saturated wet steam in the secondary heater; and delivering the additional superheated, dry steam to the supply duct located within the oven via the third set of steam piping connecting the secondary heater to the supply duct.

* * * * *